UNITED STATES PATENT OFFICE.

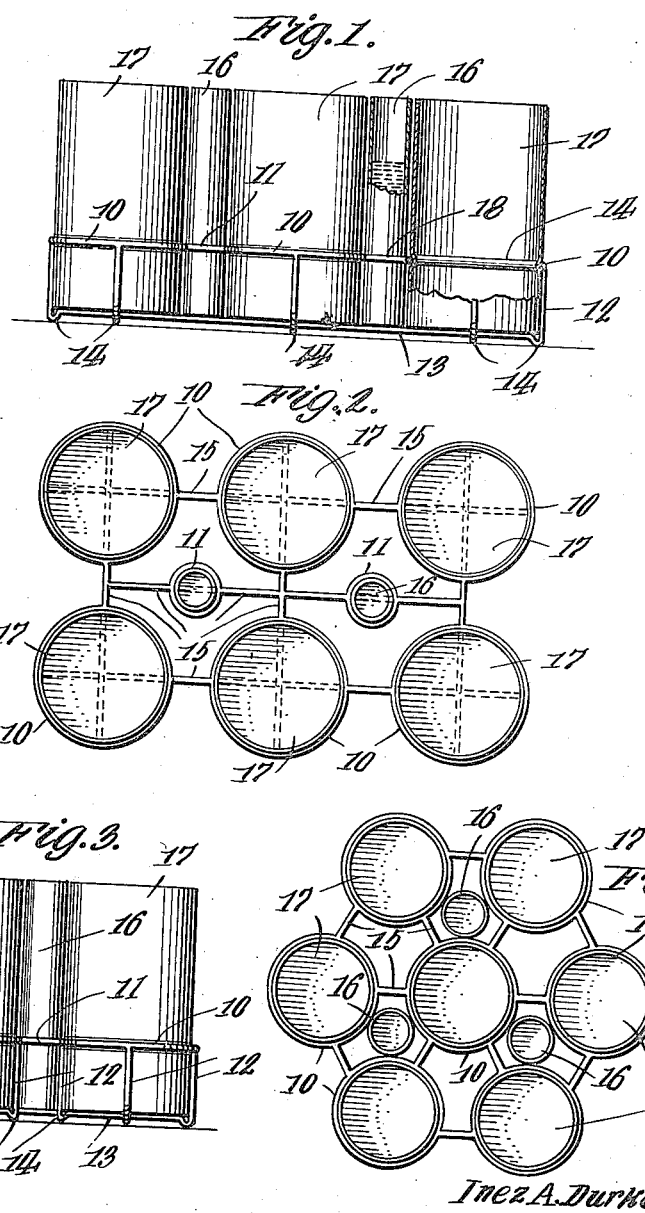

INEZ A. DURKEE, OF GRANITE, OREGON.

BAKING-PAN.

1,283,482.

Specification of Letters Patent.  Patented Nov. 5, 1918.

Application filed December 15, 1917. Serial No. 207,296.

*To all whom it may concern:*

Be it known that I, INEZ A. DURKEE, a citizen of the United States, residing at Granite, in the county of Grant and State of Oregon, have invented certain new and useful Improvements in Baking-Pans, of which the following is a specification.

This invention relates to an improved baking pan and the principal object of the invention is to provide a baking pan so constructed that a loaf of bread may be baked without excessive crust being formed and further so constructed that crust formed may be kept soft and prevented from hardening.

Another object of the invention is to provide an improved type of dough receptacle or baking pan and to further provide an improved type of frame for carrying the pan and permitting heat to circulate about the pan.

Another object of the invention is to so construct this frame that smaller receptacles containing water may be carried in the frame which water will be converted into steam thus supplying the necessary moisture to prevent the crust from hardening while the bread is baking.

Another object of this invention is to so construct the frame and dough receptacles that the receptacles may be removed from the frame for easy cleaning.

This invention is illustrated in the accompanying drawings, wherein:—

Figure 1 is a side elevation of the improved device with one of the water receptacles and dough receptacles shown in section, Fig. 2 is a top plan view of the improved device, Fig. 3 is an end elevation of the improved device, Fig. 4 is a top plan view showing a slightly modified construction.

This baking device includes a frame or basket, dough receptacle or containers and water receptacles or containers which are positioned in the frame or basket adjacent the dough containers that the steam will have ready access to the dough thus preventing burning or hardening of the crust. The basket is provided with rings or collars 10 and 11 carried by supporting standards or legs extending upwardly from the base rods 3 and bent to provide elevating seats 14 which are provided to permit heat to circulate beneath the baking pan. These rings or collars are connected by bracing rods 15 which serve to hold the rings in the proper position. From an inspection of Figs. 2 and 4, it will be seen that the arrangement of the rings may be made according to the desires of the person constructing the basket, no particular shape of basket being necessary. It is desired however, that the collars for holding the liquid receptacles 16 be placed with collars or sockets carrying the dough receptacles 17 placed about the liquid receptacles 16 so that the steam may be evenly distributed. These receptacles are provided with grooves 18 and 19 into which fit the rings 10 and 11 thus serving to prevent danger of the receptacles accidentally slipping out of place. The rings of the dough receptacles will further serve as measuring marks showing the amount of dough to be placed in the receptacles.

When in use, dough will be placed in the receptacles 17 and allowed to rise. Dough rises better if it is held against side expansion and as these dough receptacles are deep in comparison with their diameter, the dough will be held against side expansion. After the dough has been allowed to rise for the necessary length of time, the liquid receptacles 11 will be filled with water and the pan will then be placed in the oven. The feet 14 will serve to raise the basket from the bottom of the oven thus permitting the heat to reach the bottoms of the dough receptacles and have a good baking action. The heat of the oven will convert the water of the water receptacles into steam thus moistening the air in the oven and thus preventing the crust from burning or hardening from too quick a baking. When the bread has been baked, the pans or dough receptacles may be moved from the basket and the device can then be easily and thoroughly cleaned. The water receptacles and dough receptacles can then be put back in place and the device is then ready for use.

What is claimed is:—

1. A baking device comprising a basket, having elevating feet and provided with relatively large and small sockets, the small sockets being surrounded by the large sockets, dough receptacles mounted in the large sockets and water receptacles mounted in the small sockets.

2. A baking device comprising a basket, having relatively large sockets and relatively small sockets surrounded by the relatively large sockets, water receptacles in the relatively small sockets and dough receptacles in the relatively large sockets.

3. A baking device comprising a basket having rings forming collars, base rods having their end portions extended upwardly and connected with the collars to provide supporting standards for the collars, bracing rods connecting the collars, and receptacles fitting into the collars and provided with annular grooves forming seats to receive the collars.

4. A baking device comprising a basket including rings forming collars, and receptacles fitting within the collars and provided with annular grooves receiving the rings of the collars.

5. A baking device comprising a supporting basket including a plurality of relatively large receptacle receiving rings, brace rods connecting said rings in spaced relation, and a plurality of relatively small receptacle receiving rings connected with certain of said brace rods and surrounded by said larger rings.

In testimony whereof I affix my signature in presence of two witnesses.

INEZ A. DURKEE.

Witnesses:
W. E. NARKANS,
C. W. LONG.